(12) United States Patent
Danziger

(10) Patent No.: US 7,485,862 B2
(45) Date of Patent: Feb. 3, 2009

(54) TIME-SPACE MULTIPLEXED LADAR

(75) Inventor: Yochay Danziger, Kfar Vradim (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 0 days.

(21) Appl. No.: 11/627,996

(22) Filed: Jan. 29, 2007

(65) Prior Publication Data

US 2007/0177841 A1 Aug. 2, 2007

(30) Foreign Application Priority Data

Jan. 29, 2006 (IL) ..................................... 173420
Feb. 20, 2006 (IL) ..................................... 173818
Mar. 5, 2006 (IL) ..................................... 174111

(51) Int. Cl.
*G01J 5/02* (2006.01)

(52) U.S. Cl. .................................................. 250/339.1

(58) Field of Classification Search ............ 250/339.01, 250/339.02, 339.03, 339.04, 339.05, 339.06, 250/339.07, 339.08, 339.09, 339.1; 244/3.16
See application file for complete search history.

(56) References Cited

U.S. PATENT DOCUMENTS

| | | | | |
|---|---|---|---|---|
| 3,991,318 A | | 11/1976 | Duguay | |
| 4,696,441 A | * | 9/1987 | Jones et al. | 244/3.13 |
| 5,465,142 A | * | 11/1995 | Krumes et al. | 356/5.01 |
| 6,302,355 B1 | * | 10/2001 | Sallee et al. | 244/3.16 |
| 6,993,255 B2 | * | 1/2006 | Braun et al. | 396/61 |
| 7,113,674 B2 | * | 9/2006 | Ohta et al. | 385/37 |
| 2002/0060784 A1 | | 5/2002 | Pack et al. | |
| 2003/0202729 A1 | * | 10/2003 | Liu et al. | 385/11 |
| 2005/0018264 A1 | | 1/2005 | Benedict | |

* cited by examiner

*Primary Examiner*—David P Porta
*Assistant Examiner*—Kiho Kim
(74) *Attorney, Agent, or Firm*—Mark M. Friedman

(57) ABSTRACT

A LADAR system includes a detector optical arrangement defining a current optical field of view. An illumination subsystem without moving parts transmits pulsed illumination at different times to each of a number of illumination sub-regions of the current optical field of view, and a detection subsystem, including one or more detectors, detects reflected illumination from a corresponding one or more detection sub-region of the current optical field of view. Each of the detection sub-regions overlaps illumination sub-regions so that an overlap of each of the illumination sub-regions with the detection sub-region defines a LADAR image pixel of resolution finer than the detection sub-region.

24 Claims, 12 Drawing Sheets

TIME-SPACE MULTIPLEXED LADAR

FIELD AND BACKGROUND OF THE INVENTION

The present invention relates to LADAR and, in particular, it concerns a LADAR system in which illumination pulses are spatially and temporally distributed in order to achieve plural pixel resolution within an area sensed by a single detector.

LADAR systems create 3D image of the an object or terrain by transmitting time varying light to various directions in their Field Of View (FOV) and measuring the time it took the light to reach the detector after being reflected. The result is effectively a surface map of the viewed scene, where each pixel value corresponds to a distance from the LADAR system to the object viewed. This will be referred to herein as a LADAR "image".

LADARS are designed according to two main architectures:

Staring LADAR is based on a matrix of detectors that stare at the relevant Field Of View (FOV) and the illumination is performed by a pulsed laser that illuminate all the FOV instantaneously. Unfortunately, this method requires high power laser in order to generate the required Signal Noise Ratio (SNR) in every pixel of the detector.

Scanning system is based on partial illumination of the total Field Of Regard (FOR) by a smaller scanned FOV (in most cases a line illumination). Consequently only part of the FOR is illuminated at a time and the power requirement from the laser is reduced. However, at some applications where long range is required the laser can not generate the required power. Furthermore, in order to have a compact design of the LADAR, further reduction of the number of detectors is needed.

Fiber based lasers are becoming the workhorse of the laser industry because of their low cost of ownership and reliability. Unfortunately, fiber technology is limited in term of output power. Therefore, it is very difficult to implement fiber lasers in LADAR systems.

Receiver technology is also expensive and complicated therefore, methods where developed for utilizing single receiver for interpreting the signal received from various directions by utilizing Time Domain Multiplexing (TDM) technology. In patent US20020020806A1 TDM is achieved at the receiver by using different fiber length as presented in FIG. 1. A very high power laser is transmitting 51 light pulses which are split simultaneously to the relevant FOV by optics 62. The light travels in free space and being reflected as a signal back to the receiver (schematically represented as 64). Multimode fiber tips are located at the focal plane of the receiving optics where each fiber has different length 66. Consequently, the signal arrives to the detector at different times from different sections or directions of the FOV.

Unfortunately, this method requires high power laser in addition to the fact that substantial loss is introduced to the signal by the optics and the fibers. Furthermore, the alignment of the receiving fiber tips to the transmission optics is complicated and unreliable.

There is a need for a technology that will enable the use of reliable fiber lasers in LADAR systems by reducing the need for high intensity output, without compromising on system performance. This technology should be compact in size in order to fit to most portable applications. Furthermore, there is a need for a method to split the laser light to the various sections of the FOV while introducing minimal loss. The required system should be robust to misalignment between the transmitting and receiving optics.

SUMMARY OF THE INVENTION

The present invention is a LADAR system in which illumination pulses are spatially and temporally distributed in order to achieve plural pixel resolution within an area sensed by a single detector.

According to the teachings of the present invention there is provided, a LADAR system comprising: (a) a detector optical arrangement defining a current optical field of view; (b) an illumination subsystem configured for transmitting pulsed illumination at different times to each of a plurality of illumination sub-regions of the current optical field of view without moving parts; and (c) a detection subsystem including one or more detectors deployed for detecting reflected illumination from a corresponding one or more detection sub-region of the current optical field of view, wherein each of the one or more detection sub-regions overlaps a plurality of the illumination sub-regions, an overlap of each of the illumination sub-regions with the detection sub-region defining a RADAR image pixel of resolution finer than the detection sub-region.

According to a further feature of the present invention, sequential pulses transmitted to the illumination sub-regions are transmitted at times differing by no more than 10 microseconds.

According to a further feature of the present invention, illumination pulses transmitted to at least two of the illumination sub-regions originate from a single laser source, and wherein a time delay between the illumination pulses is introduced by an optical path difference between paths traveled by pulses to the at least two illumination sub-regions.

According to a further feature of the present invention, illumination pulses transmitted to at least two of the illumination sub-regions originate from at least two illumination sources electronically triggered to generate pulses at different times.

According to a further feature of the present invention, the illumination subsystem and the detection subsystem are configured such that every pair of adjacent LADAR image pixels satisfies one of the following conditions: the pair of adjacent pixels are illuminated at the same time; or the pair of adjacent pixels are detected by a common one of the one or more detectors.

According to a further feature of the present invention, the detection subsystem includes a plurality of the detectors, an area of intersection between each of the illumination sub-regions and each of the detection sub-regions uniquely defining one of the LADAR image pixels, a number of the LADAR image pixels being equal to the product of the numbers of the illumination sub-regions and the detection sub-regions.

According to a further feature of the present invention, each of the detection sub-regions is a substantially contiguous sub-region within the current optical field of view, and wherein each of the illumination sub-regions is a pattern of disparate spots distributed between the detection sub-regions.

According to a further feature of the present invention, each of the illumination sub-regions is a substantially contiguous sub-region within the current optical field of view, and wherein each of the detection sub-regions is a pattern of disparate spots distributed between the illumination sub-regions.

According to a further feature of the present invention, each of the illumination sub-regions is elongated in a first direction, and wherein each of the detection sub-regions is elongated in a second direction non-parallel to the first direction such that the LADAR image pixels form a two-dimensional grid.

According to a further feature of the present invention, the illumination subsystem and the detection subsystem transmit and receive illumination via the detector optical arrangement.

According to a further feature of the present invention, the illumination subsystem transmits illumination pulses via a focal plane array of optical fiber tips.

According to a further feature of the present invention, the illumination subsystem transmits from each of the optical fiber tips pulses of illumination differing in at least one property selected from the group comprising wavelength and polarization, the pulses being directed by an optically dispersive arrangement such that pulses from each of the optical fiber tips are transmitted in a plurality of directions.

According to a further feature of the present invention, the current optical field of view has a long dimension and a short dimension, the LADAR system further comprising a scanning arrangement for scanning the current optical field of view in a direction substantially perpendicular to the long dimension.

According to a further feature of the present invention, there is also provided a controller associated with the illumination subsystem and configured for actuating an illumination pulse for each of the plurality of illumination sub-regions in rapid sequence before receipt of any reflected illumination pulse.

According to a further feature of the present invention, there is also provided a controller associated with the illumination subsystem and configured for actuating an illumination pulse for each of the plurality of illumination sub-regions in a timed sequence to allow for receipt of a reflected illumination pulse between successive transmitted pulses.

According to a further feature of the present invention, there is also provided a controller associated with the illumination subsystem and configured for dynamically varying timed actuation of an illumination pulse for each of the plurality of illumination sub-regions between a long-range mode in which illumination pulses for all illumination sub-regions are transmitted in rapid sequence before receipt of any reflected illumination pulse and a short-range mode in which a delay is introduced between transmission of pulses to a first subgroup and a second subgroup of the illumination sub-regions to allow for receipt of a reflected illumination pulse between successive transmitted pulses.

According to a further feature of the present invention, both the illumination subsystem and the detection subsystem are connected via fiber coupling arrangements to a set of optical fibers terminating at tips arranged at a focal plane of the detector optical arrangement such that each optical fiber tip transmits an illumination pulse to a given LADAR image pixel and receives reflected radiation from the given LADAR image pixel.

According to a further feature of the present invention, the fiber coupling arrangement includes an optical circulator.

There is also provided according to the teachings of the present invention, a fiber coupler comprising: (a) a primary optic fiber having a core and a clad, the clad having a first refractive index; and (b) a branch fiber forming an acute-angled junction with the primary optic fiber, at least part of the branch fiber having a higher refractive index than the first refractive index, the at least part of the branch fiber optically coupled with the clad of the primary optic fiber but spaced from the core of the primary optic fiber.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
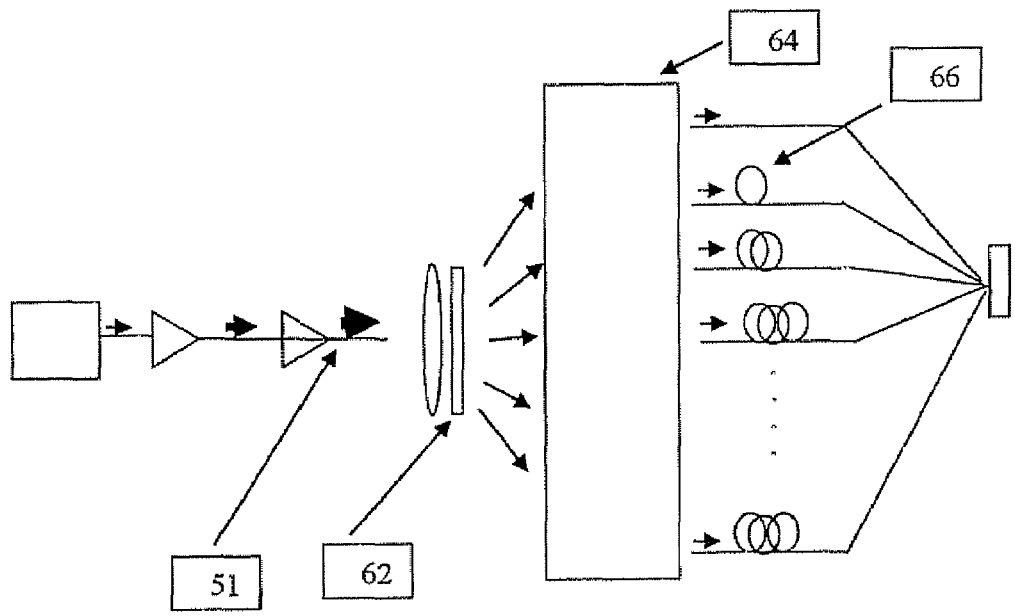
FIG. 1 is a schematic representation of a prior art arrangement for time multiplexing at the receiver performed by receiving the signal with plurality of fibers having different length.

The present invention is a LADAR system and corresponding method.

The principles and operation of LADAR systems according to the present invention may be better understood with reference to the drawings and the accompanying description.

Before referring directly to the drawings, in general terms, the present invention provides a LADAR system including a detector optical arrangement defining a current optical field of view. An illumination subsystem is configured to transmit pulsed illumination at different times to each of a plurality of illumination sub-regions of the current optical field of view, and a detection subsystem, including one or more detectors, is deployed for detecting reflected illumination from a corresponding one or more detection sub-region of the current optical field of view. Each of the detection sub-regions overlaps a plurality of the illumination sub-regions, so that an overlap of each of the illumination sub-regions with the detection sub-region defines a LADAR image pixel of resolution finer than the detection sub-region.

Transmission of sequential pulses to the different illumination sub-regions is achieved without mechanical movement, and times between sequential pulses are in some preferred cases no more than 10 microseconds. These time delays are, in some preferred cases, produced by an optical path difference between paths traveled by pulses to the at least two illumination sub-regions where the pulses originate from a single laser source. Alternatively, or additionally, illumination pulses transmitted to different illumination sub-regions may originate from two laser sources electronically triggered to generate pulses at different times.

In certain preferred cases, a plurality of detectors are provided. In this case, the number of LADAR image pixels is preferably equal to the product of the numbers of illumination sub-regions and the number of detection sub-regions.

Various geometrical arrangements of the illumination sub-regions and detection sub-regions will be exemplified below. Possibilities include: detection sub-regions as substantially contiguous sub-regions and illumination sub-regions as a pattern of disparate spots distributed between the detection sub-regions; illumination sub-regions as substantially contiguous sub-regions and detection sub-regions as a pattern of disparate spots distributed between the illumination sub-regions; and illumination sub-regions elongated in a first direction and detection sub-regions elongated in a non-parallel direction to form a two-dimensional grid of LADAR pixels.

In certain particularly preferred implementations, the illumination subsystem transmits illumination pulses via a focal plane array of optical fiber tips. Optionally, and particularly to achieve an improve fill factor between illuminated spots, the illumination subsystem transmits from each of the optical fiber tips pulses of illumination differing in either wavelength or polarization. An appropriate optically dispersive arrangement (diffractive or refractive element for wavelength, polarized splitter for polarization) is then used to direct pulses from each of the optical fiber tips in a plurality of distinct directions.

As mentioned, the LADAR of the present invention achieves time and space division of illumination within the current field of view without any moving parts. In this context, the phrase "without moving parts" refers to the fact that the illumination subsystem does not include mechanically scanning elements, mechanical switches or the like. It should be noted however that this language does not preclude motion of the entire illumination subsystem as a unit. Specifically, in certain preferred cases, the total field of regard of the system is supplemented by including a scanning arrangement for scanning the current optical field of view. In particular, where the field of view is long and thin, scanning is most preferably performed in a direction substantially perpendicular to the long dimension.

In certain particularly preferred implementations, the LADAR system of the present invention includes a controller associated with the illumination subsystem and configured for timed actuation of an illumination pulse for each of the plurality of illumination sub-regions according to one or more sequence, particularly varying according to the distance (range) to the objects within the field of view. Specifically, in a long-range mode, illumination pulses for all illumination sub-regions are preferably transmitted in rapid sequence before receipt of any reflected illumination pulse. In a short-range mode, a delay is introduced between transmission of pulses to a first subgroup and a second subgroup of the illumination sub-regions to allow for receipt of a reflected illumination pulse between successive transmitted pulses. Most preferably, the controller may dynamically switch between these modes, and between variously spaced implementations of the short-range mode, according to the detected range of the scene being currently detected.

The illumination subsystem and the detection subsystem are preferably connected via fiber coupling arrangements to a set of optical fibers terminating at tips arranged at a focal plane of the detector optical arrangement such that each optical fiber tip transmits an illumination pulse to a given LADAR image pixel and receives reflected radiation from the given LADAR image pixel. To facilitate this connection, particularly preferred implementations of the present invention provide a fiber coupler which is believed to be of patentable significance in its own right for a range of other applications, and which may be used to advantage in synergy with the LADAR systems of the present invention. This fiber coupler will be described below with reference to FIGS. 10-12. Alternatively, an optical circulator may be used to provide the aforementioned fiber coupling arrangement.

Figure 2:
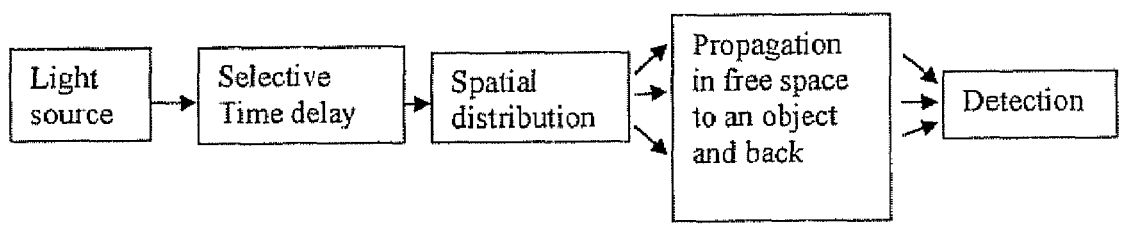
FIG. 2 is a schematic functional representation of the principles underlying the present invention.

Referring now to the drawings, the basic principle of this invention is described in FIG. 2. The light pulses from the light sources are selectively time delayed relative to each other using optical or electronic means. Then the various pulses are spatially distributed and transmitted to propagate in free space to illuminate an object. No time delay means are implemented at the receiver when detecting the plurality of reflected signals from the object.

Figure 3:
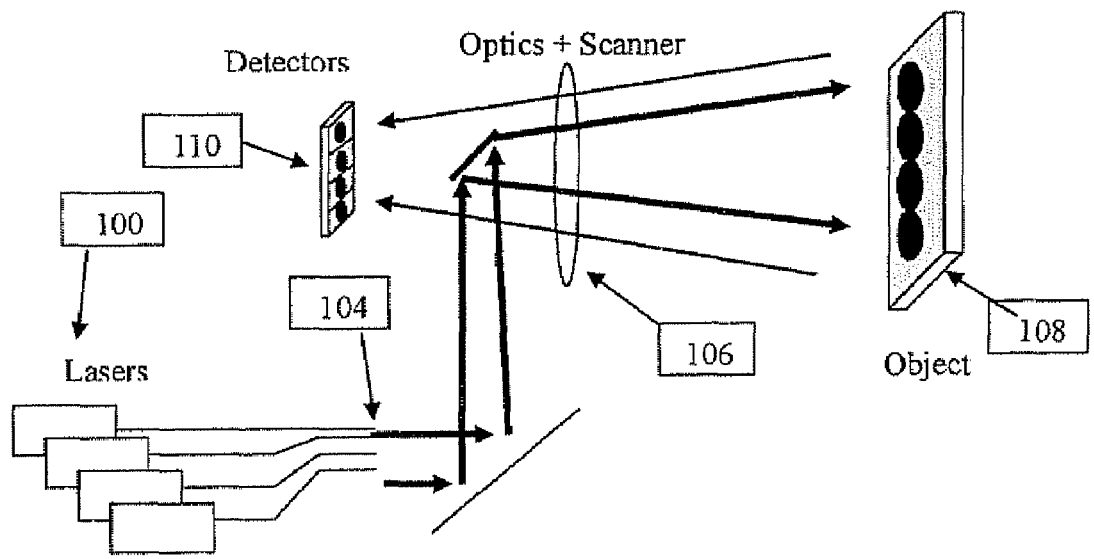
FIG. 3 is a schematic representation of a basic optical LADAR architecture employed for implementing the various embodiments of the present invention.

An example of the optical setup used in the present invention is described in FIG. 3. Lasers 100 transmit light pulses through optical fibers. The fiber tips 104 are arranged in the focal plane of an optical setup 106 and illuminate the object 108. This way every laser illuminates a slightly different angle and thereby a different part (or section) of the FOV. The reflected pulses from the target are focused on the detectors 110 or on a fiber bundle that guide the light to the detectors (not depicted). In a first set of particularly preferred implementations, the illumination subsystem and the detection subsystem transmit and receive illumination via a common optical arrangement, referred to here as the detector optical arrangement. In an alternative embodiment, the optical setups used for transmission and reception are different optical setups.

It should be noted that, for simplicity of explanation, the preferred embodiments of the present invention will be presented below primarily in a schematic functional manner as a progression from left-to-right where the detector optics appear at the right-most extreme of the figures. Since the LADAR systems of the present invention are detectors of reflected radiation, it will be clear that the optical arrangements for transmission and detection are actually placed on the same side of the scene being viewed, and in most preferred cases, are combined into a single optical arrangement. Various techniques, and corresponding components (e g., fiber couplers), for facilitating transmission and detection via a common optical arrangement are described below. The remaining details of a practical implementation of the present invention, including details of a processing system for controlling the illumination sequence, processing received signals from the detectors and deriving range information therefrom, will be fully understood by a person having ordinary skill in the art on the basis of the schematic description.

In this invention, if the transmitting fibers originate from the same laser but have different length so that the pulses are transmitted at different times, the transmission is considered functionally to be from different lasers. Thus, when reference is made to pulses transmitted from "different lasers", or from "different fibers", this includes the possibilities of pulses originating both from a common source and from different sources, unless otherwise specified.

In this invention the term "fiber laser" is used to refer to any laser whose final transmission is made through fibers.

Although, in the preferred embodiment of this invention transmission is made through optical fibers, in some applications the light from the different lasers is transmitted using only mirrors and free space optics. This free space configuration is considered part of this invention as long as the different output beams from the different lasers illuminate different parts of the FOV at different times preferably without moving parts. Furthermore, it should be noted that reference is made of optic fibers as a particularly preferred implementation, but it will appreciated that other forms of waveguide may be used, and should be understood as encompassed by the description unless explicitly excluded.

Figure 4:
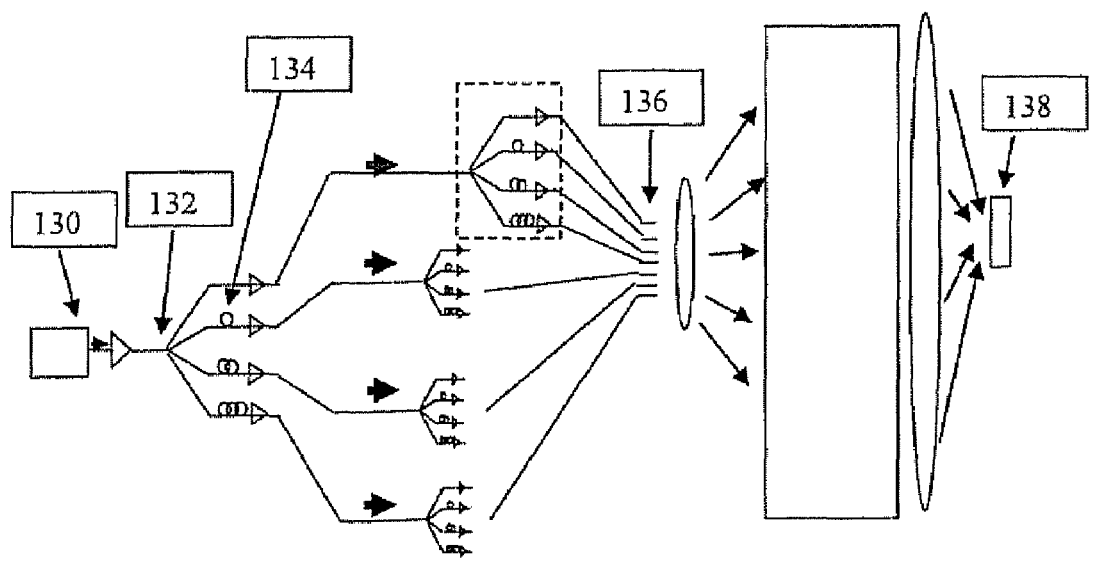
FIG. 4 is a schematic representation of a first embodiment of the present invention in which a plurality of fiber tips are used to transmit light pulses originated by a single source at different times.

The first embodiment of this invention is depicted in FIG. 4. Light pulses originated by a light sources 130 are being repeatedly amplified and split 132 so that the intensity in every fiber is maintained below fiber damage threshold. Every fiber has different length (presented as loops 134) causing the pulse to be transmitted at different times by the different fiber tips 136, which are located at the focal plane of the transmitting optics. This arrangement distributes spatially the various time delayed pulses to the various directions in the FOV. A single detector 138 is preferably placed at the focal plane of the receiving optics. In the case of a single detector, it will be noted that the "detection sub-region" preferably corresponds to substantially the entirety of the current optical field of view of the system.

In this configuration the time difference between the transmissions of light pulses from the different fibers is predetermined. Therefore, if reflections reach the detector too soon (i e, the object at very short range) there could be an ambivalence problem between received signals and the light scattered from the transmitted pulses. For example, the reflected signal originated by the first pulse could reach the detector at the same time that the last pulse is being transmitted. This problem can be solved, in this configuration, only by switching off the amplifiers of the last transmitting fibers.

Figure 5:
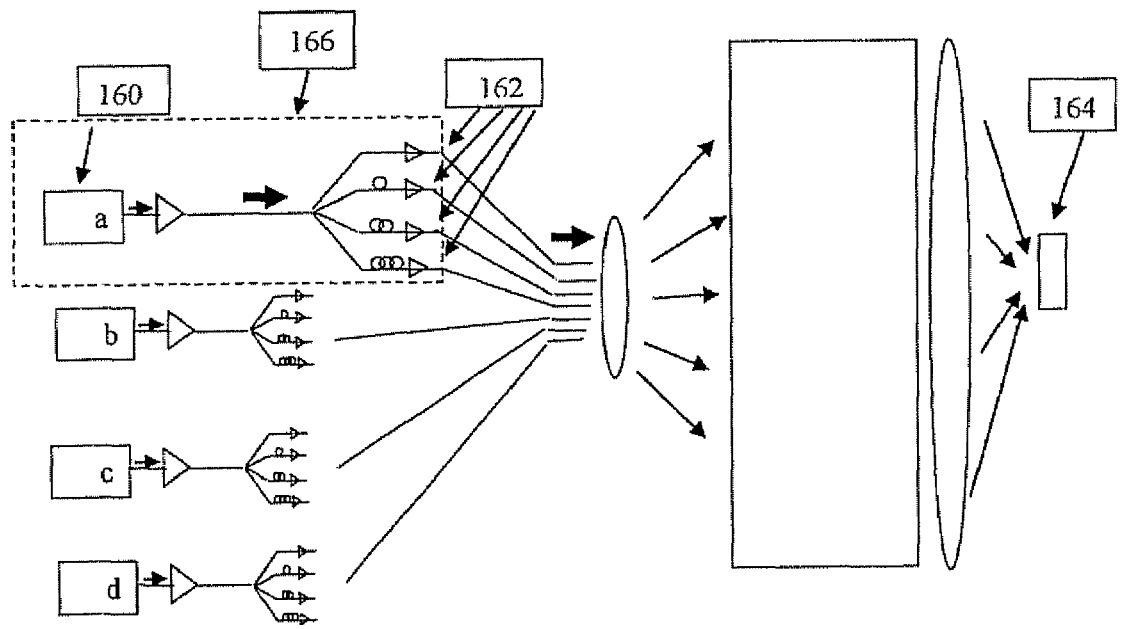
FIG. 5 is a schematic representation of an embodiment similar to that of FIG. 4, but in which a plurality of light sources are used in order to facilitate varying time delays between groups of transmitted pulses.
Figure 6:
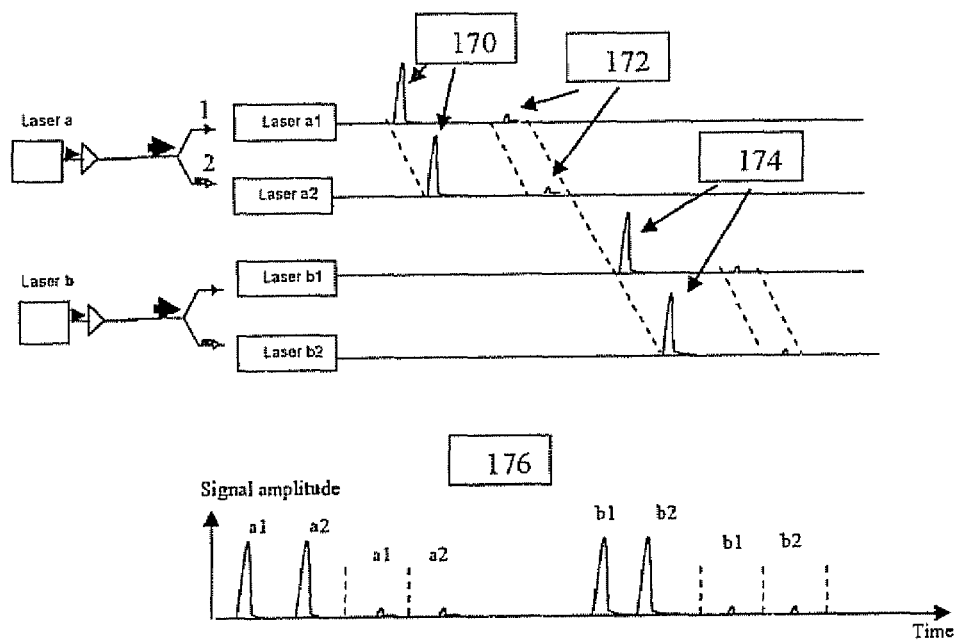
FIG. 6 is a schematic representation of a possible pattern of synchronization of transmitted pulses for use in the embodiment of FIG. 5, illustrated with only two light sources for simplicity of presentation, where the second laser transmits only after the reception of the signal originated by the first laser.

This limitation can be partially alleviated by using more sources and less splitters as depicted in FIG. 5. In this configuration it is possible to control the time at which every light source 160 emits. Source 160 generates a pulse which will be amplified and transmitted through fibers 162 at consecutive time intervals due to the different length of each of these fibers. Only after the detector 164 receives all the signals originated by this source will the next source transmit its' pulse. This will reduce the minimal operational range of the LADAR by a factor equivalent to the number of sources. For example, FIG. 6 describes the detection scheme of two lasers having two output fibers each. After the first laser transmits two consecutive pulses 170 the two signals are detected 172. Only then will the second laser transmit its pulses 174. The detector will receive the reflected signal as it is presented in diagram 176 where the vertical axis is arbitrary intensity units and the horizontal axis is time in arbitrary units.

Figure 7:
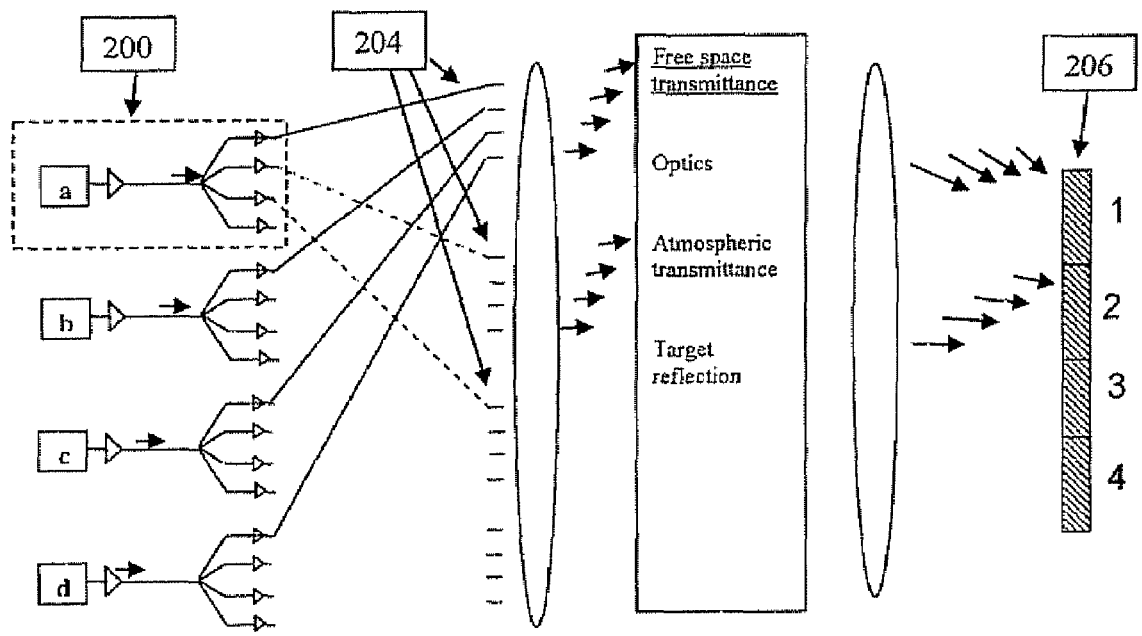
FIG. 7 is a schematic representation of a LADAR system according to the present invention implemented without time delay fibers and in which the number of points (pixels) in the illuminated vector is equal to the product of the number of detectors and the number of light sources.

In the embodiment of the present invention described in FIG. 7 the system is not limited in terms of minimal range. In this embodiment (FIG. 7) the transmitting fibers are rearranged in groups 204 so that every group is comprised of fibers originated by different sources (a, b, c and d) and every group illuminating a FOV which is detected by a single detector 206 (1,2,3 or 4).

Figure 8:
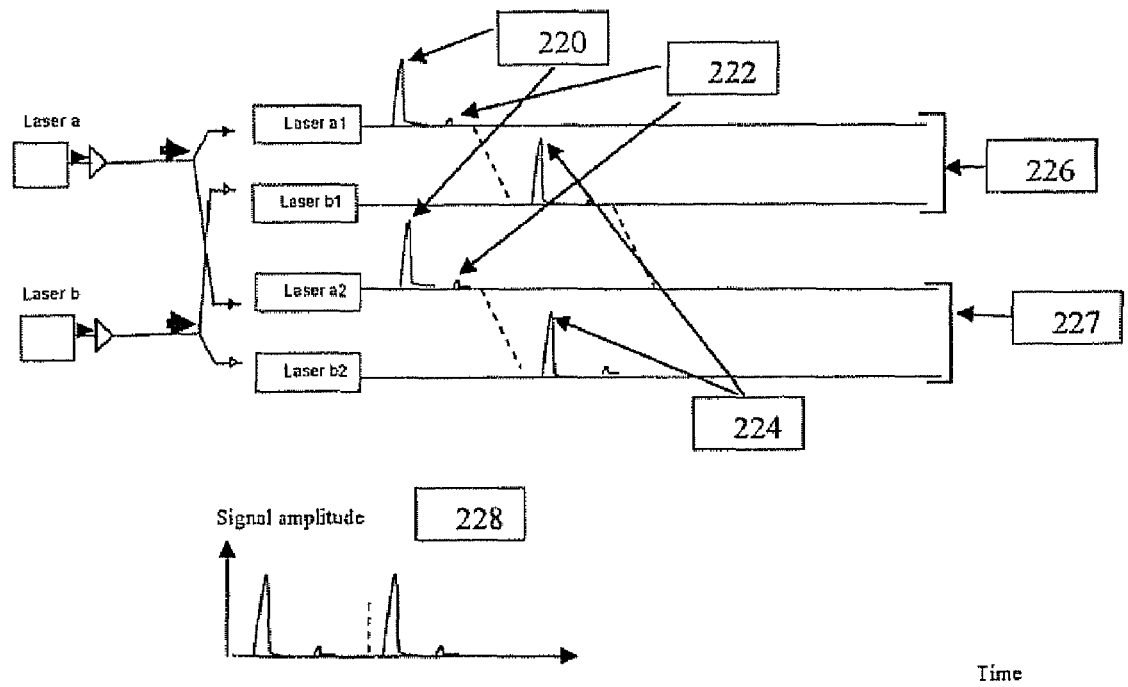
FIG. 8 is a schematic representation of a simplified version of the LADAR system of FIG. 7 having two sources, two detectors and no delay fibers, illustrating a pattern of synchronization of transmitted pulses in which each source transmits only after the reception of the signal originated by the previous transmission.

The sources 200 transmit at different times, therefore light pulses will be transmitted at different times from the fibers within each croup 204. The detectors 206 will detect the reflections from the object at different times and according to this time it will be possible to distinguish the reflections from the different directions. In this configuration it is possible to chance the method of transmission as needed. The method could be equivalent to the method used in FIG. 4 where all the pulses are transmitted before signal reception. It could also be according to the method presented in FIG. 6 where part of the pulses are transmitted each time before signal reception or in extreme case (as described in FIG. 8), only one laser transmits 220 each time and the signal 222 is detected before the second laser transmits 224. The signal detected by each of the detectors (schematically described as 226 and 227) is described in diagram 228 where the axes are same as in diagram 176.

Parenthetically, it should be noted that an extreme example of the multiple source approach of FIG. 7 would employ an independently electrically controlled source for each illuminated pixel and a single detector common to all of the field of view. Such an embodiment also falls within the scope of the present invention and may, in certain cases, provide various advantages.

Figure 9:
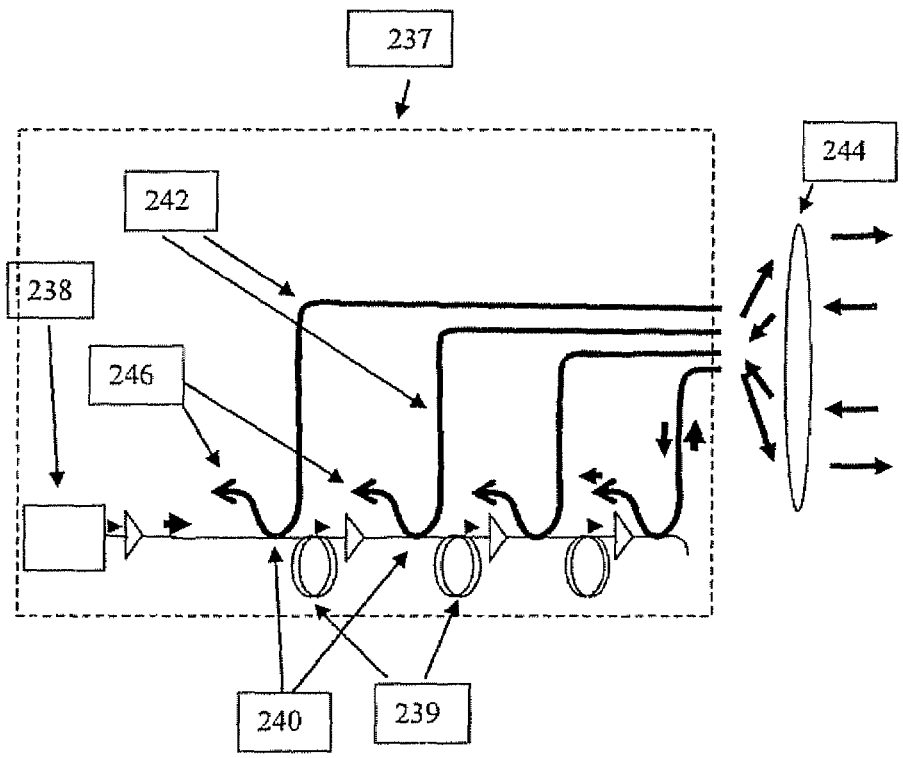
FIG. 9 is a schematic representation of a repeatable building block used to split light pulses originated by a single source into four transmitting fiber tips which also detect the received signal.

The repeated block 166 in FIG. 5 or 200 in FIG. 7, can be designed differently. For simplicity, only one of these alternative blocks is described in FIG. 9 as 237. Most of the light pulses originated by light source 238 propagate along a fiber and being amplified, delayed 239 if needed (as in 166) and coupled 240 to another fiber 242 periodically. The remainder of the pulse energy that stayed in the original fiber after the coupling is preferably amplified as a source for the next fiber (period). Fiber 242 transmits the light through optics 244 as described previously. The received signal that propagates in the opposite direction is collected by this same optics and coupled back into fiber 242. In the coupler 240 the backward propagating signal is split, part of it is coupled back into the original fiber and is lost while the rest stays in the fiber and is directed 246 to a detector (not presented in this figure). It should be noted that the configuration of FIG. 9 may be employed wherever splitting of a signal is required, including but not limited to the embodiments of FIGS. 13-18 described below.

This coupling process (240) is preferably achieved by using a two-by-two asymmetric fiber coupler, defined as a coupler that couples light between first fiber supporting low number of transverse modes to second fiber supporting larger number of transverse modes. In the preferred embodiment of this configuration Single Mode Fiber (SMF) is used as the first fiber guiding light from source 238 and a multimode fiber as the coupled transmitting fiber 242. Consequently, most of the energy propagating in the SMF will be coupled to the multimode fiber to be transmitted, while most of the backward propagating signal in the multimode fiber will reach the detector and not couple back to the SMF.

The coupler 240 described here can be also used in other configurations such as in the embodiment described in FIG. 5. However in this case the remainder of the pulse energy that stayed in the original fiber will not be reused.

A conventional coupler or circulators can also be used.

Figure 10:
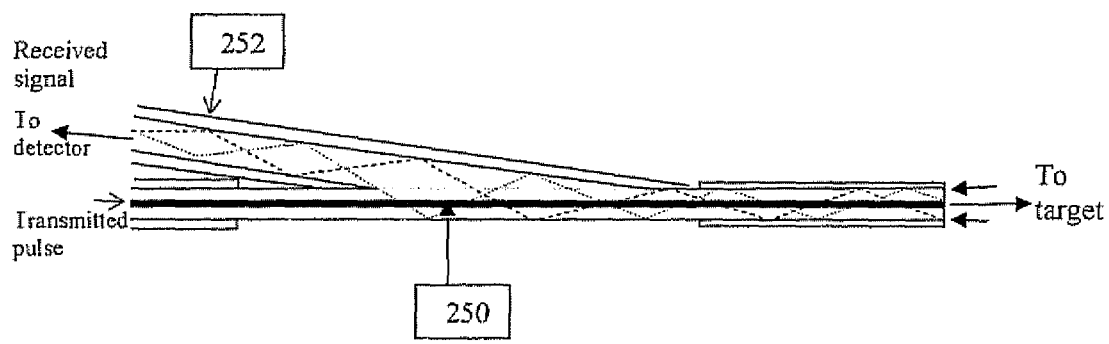
FIG. 10 is a cross-sectional view taken through a "pump coupler" useful for facilitating transmission and reception of light pulses by a common optical fiber, the pump coupler separating the path of a received signal propagating in the clad of the fiber from the path of a transmitted pulse propagating in the core of the fiber.

The separation between the transmission and the reception can also be performed using a fiber coupler, or 'pump coupler', presented in FIG. 10. In this coupler, the core 250 of the fiber transmits the signal in one direction and the clad 252 transmits the received signal in the opposite direction. However the coupler should be modified in order to achieved high efficiency.

Figure 11:
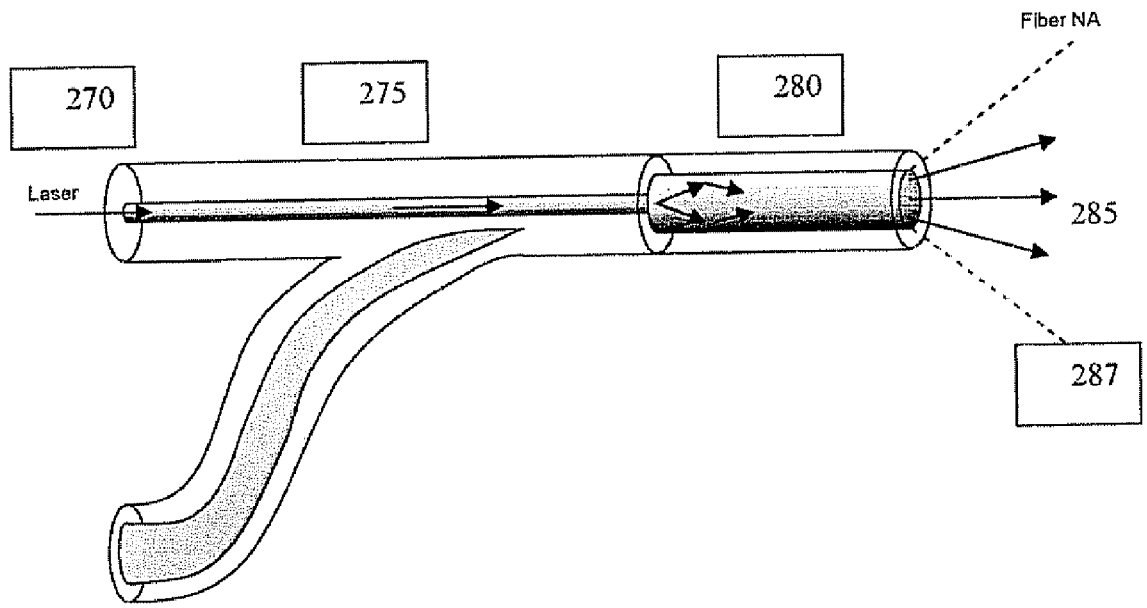
FIG. 11 is a schematic representation of the path of illumination transmitted through the pump coupler and emitted from an end-cap at the tip of the fiber.
Figure 12:
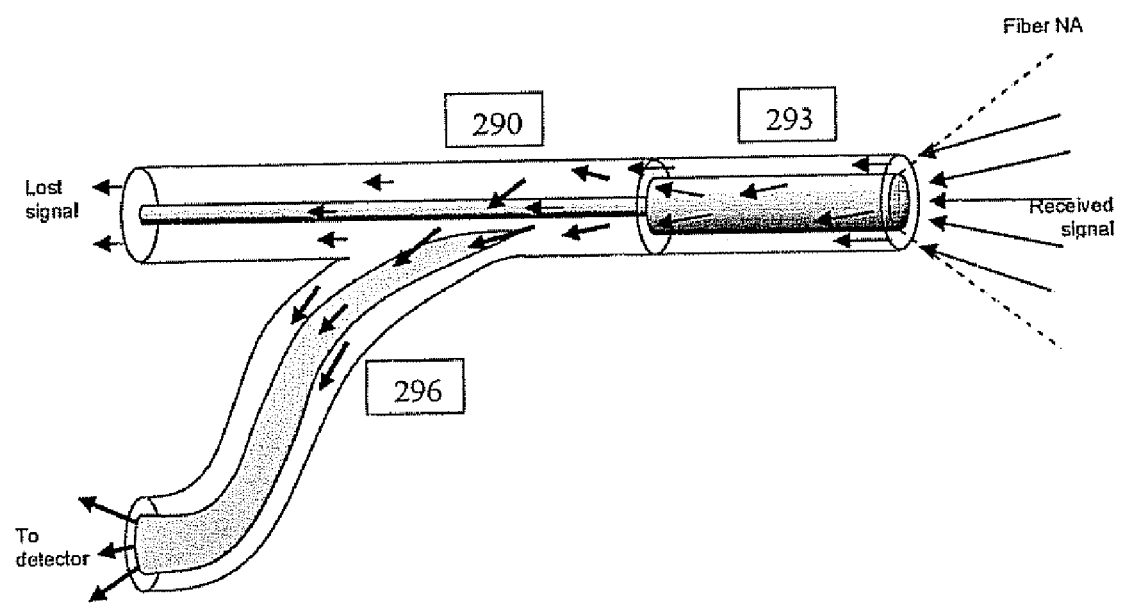
FIG. 12 is a schematic representation of the path of a received signal through the coupler.

FIGS. 11 and 12 illustrate a particularly preferred implementation of a fiber coupler, which is believed to be patentable in its own right. In general terms, the coupler includes a primary optic fiber having a core and a clad, and a branch fiber forming an acute-angled junction with the primary optic fiber. At least part of the branch fiber has a higher refractive index than the clad of the primary optic fiber. The higher refractive index part may be a core of the branch fiber, or may be the entire branch even without a core. The higher refractive index part of the branch fiber is optically coupled with the clad of the primary optic fiber but spaced from the core of the primary optic fiber. As a result the branch has little to no affect on a signal transmitted (in either direction) along the core of the primary fiber, but attracts a majority of a signal propagating in the rearward (right-to-left as shown) direction in the clad of the primary fiber.

FIG. 11 depicts schematically the illumination through the pump coupler. The laser light 270 is transmitted though the core of a first fiber 275, preferably a single mode fiber. The intensity of the transmitted light is high, therefore it is preferable to expand this light before transmitting it to free space. This can be performed by splicing to the first fiber 275 a second fiber 280 having a large core diameter. This fiber can be a single mode fiber having a large mode field diameter and therefore narrow divergence (small Numerical aperture—NA). The second fiber 280 can also be a multimode fiber having large NA. In this case the low NA of the first fiber 275 will be preserved during light propagation in the second fiber 280 and the light will emerge at narrow angle 285 relative to the second fibers capability divergence 287.

The received signal is collected by the same fiber as depicted in FIG. 12. The light of the signal is collected and it illuminates the tip of the fiber 293 (280 in previous figure). This signal propagates back in the core and in the cladding of this fiber. In fiber 290 (275 in previous) most of the light propagates in the cladding because of the difference between the core diameters of the two fibers and the difference in NA between the fibers. As the signal propagate along the clad of fiber 290 it will couple into fiber 296 because of its high refractive index. Fiber 296 is preferable a multi mode fiber having high refractive index, therefore, it supports more modes than the original fiber 290. Consequently, the light will prefer to couple (in this asymmetric coupler) to this fiber 296 rather then stay at the original fiber 290.

In principle, pump couplers do not use high refractive index as fiber 296. By using this high refractive index fiber, that sports more modes, the coupling efficiency is improved.

Figure 13:
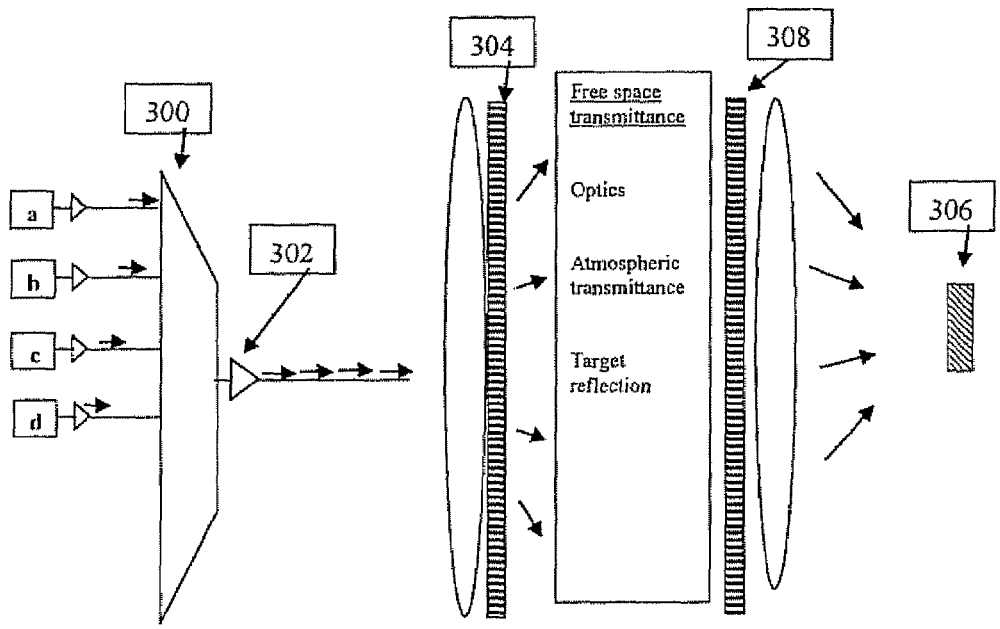
FIG. 13 is a schematic representation of a basic configuration of transmission TDM using WDM.

Splitting the transmitted pulse and introducing delay (as presented in FIG. 7 for example) can be performed in terms of wavelength as presented in FIG. 13. Here every laser transmits at different time and at different wavelength. The lasers output pulses are being multiplexed using a Wavelength Division Multiplexing (WDM) device 300. A broad band fiber optical amplifier 302 (EDFA for example) amplifies all pulses. The optical setup includes a dispersing component 304 (for example a grating or a dispersing prism) that transmits the various pulses having various wavelengths to different directions. The detection optics collects the reflected signals to detector 306. In order to minimize the size of the detector the system can also include a grating 308 at the receiving optics. Optionally, a tilt may be introduced to the grating relative to the array directions of the illumination pattern, thereby eliminating any problem which might be caused by overlap of diffraction orders.

The single detector can be replaced by a few detectors as in FIG. 7.

Figure 14:
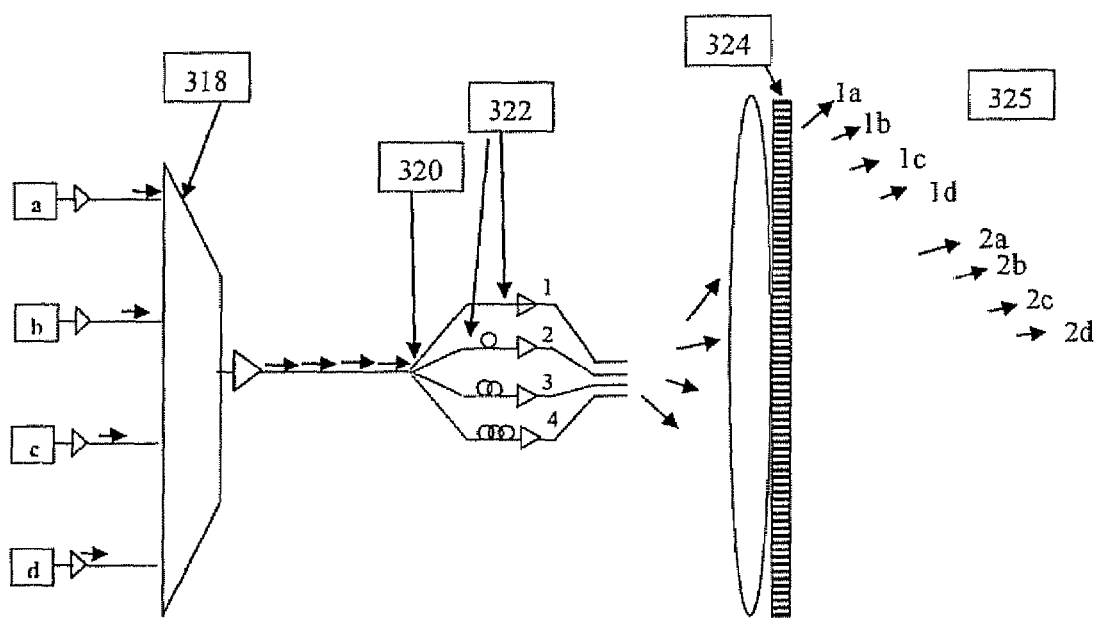
FIG. 14 is a schematic representation of a transmitter of LADAR using time delay in addition to using a few WDM multiplexed light sources, generating a configuration functionally equivalent to that of FIG. 5.
Figure 16:
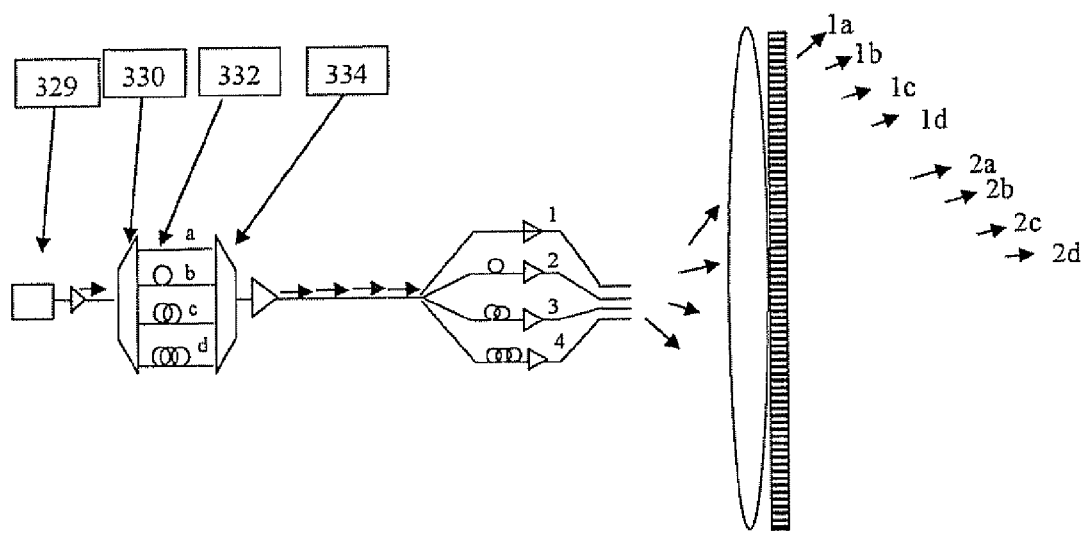
FIG. 16 is a schematic representation of a LADAR based on WDM, fiber time delay and a single source.

In FIG. 14 and FIG. 16, only the transmitter side is depicted while the receiving side is unchanged relative to previous descriptions.

In FIG. 13 a single laser was used for every direction in the FOV. This is not an efficient method. Fewer lasers are used in FIG. 14 that is equivalent to the system described in FIG. 5. In this configuration the light sources, having different wavelengths, are multiplexed 318 to a single fiber as in FIG. 13. However, in this configuration the multiplexed fiber is also split 320. This way each of the split fibers 322 guides pulses from all light sources. The fibers 322 having different length, introduce different time delay to the guided pulses. The fiber tips (marked 1,2,3 and 4) are placed at the focal plane of the transmitting optics. After the pulses pass through transmitting optics and the grating 324 they are being transmitted to various directions. The number of directions is equal to the number of sources times the number of fiber tips. In this figure some of these directions are marked 325 according to their source and fiber tip number.

In yet another embodiment of this invention the system described in FIG. 14 has no delay in fibers 322 (all fibers have the same length). This embodiment is functionally equivalent to the embodiment presented in FIG. 7, therefore requires the usage of more then one detector accordingly.

Figure 15:
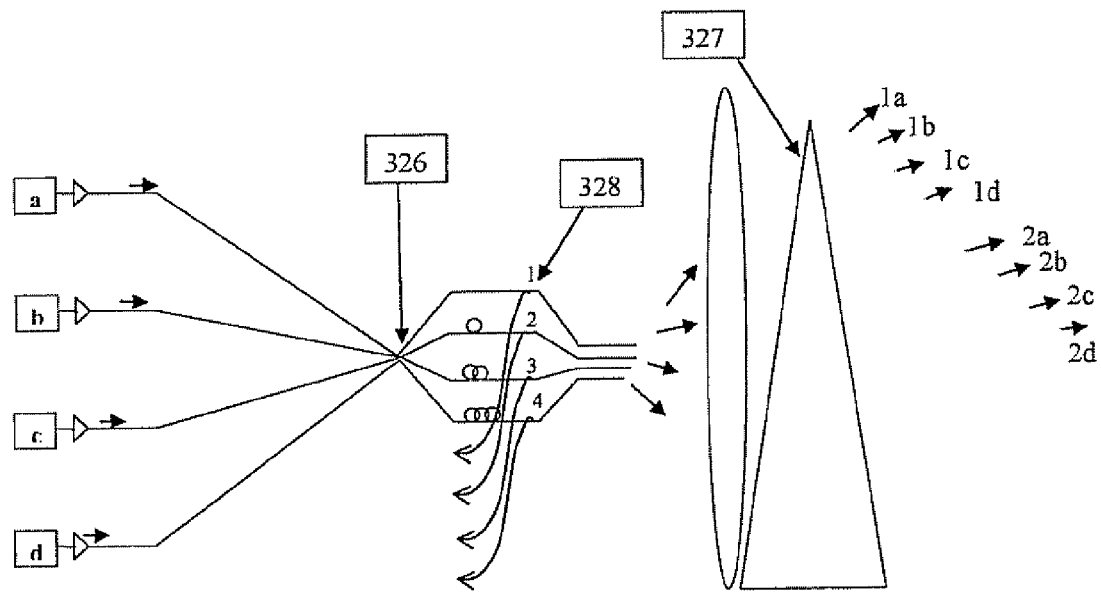
FIG. 15 is a schematic representation of a transmitter/receiver based on a 4×4 star coupler and a prism as the dispersive component, with detection via the transmitting fiber using a fiber coupler.

The embodiment presented in FIG. 15 the WDM 318 and the 1×4 splitter 320 used in FIG. 14, are replaced by a single N×M star coupler 326 (a coupler where all input ports are coupled to all output ports). Here N represents the number of input sources having different wavelength and M is the number of delay fibers placed at the focal plane of the optics. In the example in FIG. 15, N=4 and M=4. The various wavelengths are dispersed using a prism 327 (or any other dispersive component). Detection through the transmitting fiber is also depicted using couplers 328. Delay loops shown in fibers 1,2,3 and 4 are optional according to the final number of detectors used. Not all amplifiers are depicted in this figure.

FIG. 16 describes a system based on a single source which is equivalent to system depicted in FIG. 4. Here, a single source 329 is used having a broad spectrum. The pulses are demultiplexed 330 according to wavelength, each wavelength is delayed selectively 332 (labeled a, b, c and d) and multiplexed 334. The rest of the propagation is performed much the same as in FIG. 14.

Other combinations of WDM, TDM and spatial separations can be used to reduce the number of components or optimize the system.

Figure 17:
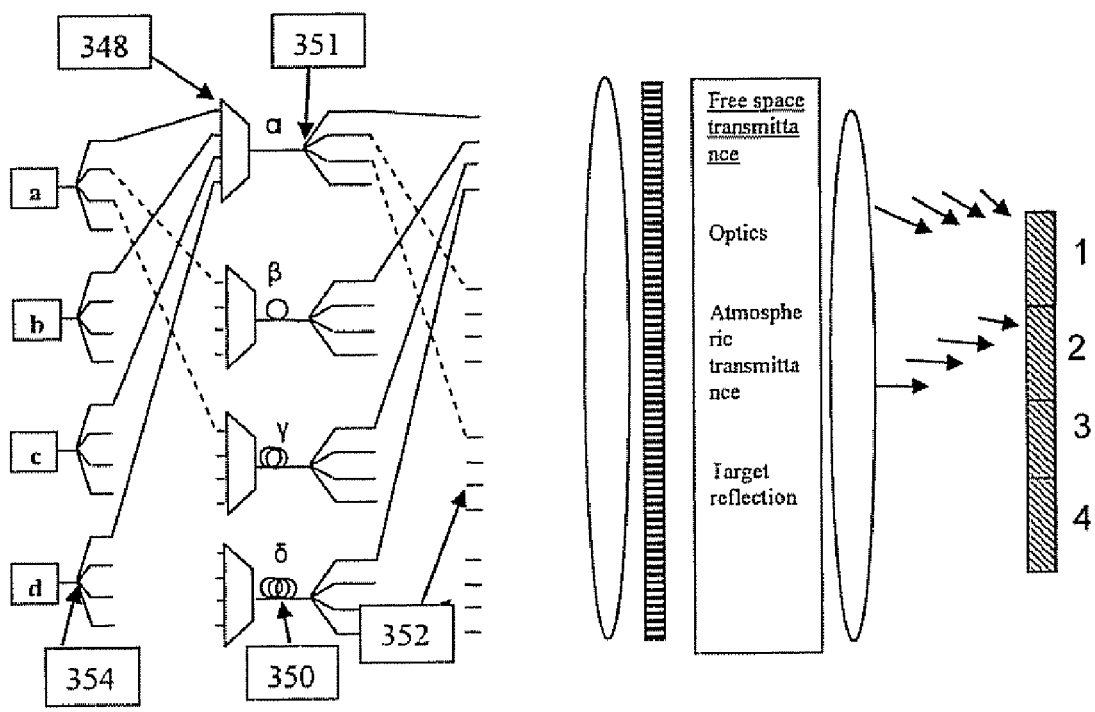
FIG. 17 is a schematic representation of a LADAR system based on multiple sources, a few WDMs and few time delays.

In FIG. 17 light sources (marked a, b, c and d), having different wavelength, transmit at different times and are split into a few WDMs 348 (marked as α, β, γ and δ) each associated with different fiber length 350 introducing different time delays. After the delay fiber, the pulses are split once more 351 and cross connected to fiber groups 352. Multiple detectors (marked 1, 2, 3 and 4) are used to detect the signals associated with the corresponding fiber groups. In yet another embodiment the light pulses pass through a grating before being detected. The overall number of resolved points in the system's FOV equals the number of sources times the number of WDMs times the number of detectors. In the example depicted in FIG. 17 there are: 4 light sources; 4 WDMs; and 4 detectors. Therefore, the overall number of resolved points in the FOV is 64.

As in FIG. 15, the star couplers 354 and the WDMs 348 can be replaces by a single N×M star coupler where N is the number of sources (1,2,3 & 4) and M is the number delay fibers (α, β, γ & δ).

As in FIG. 15, the star couplers 354 and the WDMs 348 can be replaced by a single M×N star coupler where M is the number of sources (1,2,3 & 4) and N is the number delay fibers (α, β, γ & δ). The star couplers 351 can also be eliminated when introducing the delay to each transmitting fiber.

Figure 18:
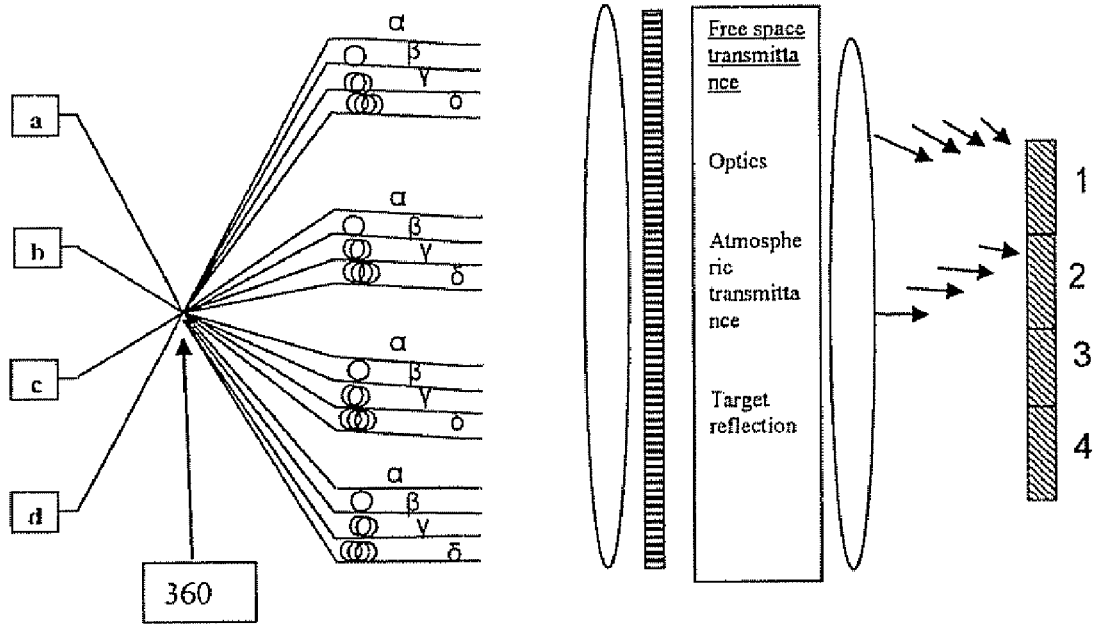
FIG. 18 is a schematic representation of a LADAR system based on an extended star coupler where the number of points illuminated equals the number of sources times the number of delay types times the number of detectors, generating a system functionally equivalent to the system of FIG. 17.

FIG. 18 depicts such a system. The extended star 360 coupler transmits from every input (a, b, c & d) to all the outputs. Therefore the number of points interrogated by this LADAR configuration equals (N×M)×L where N is the number of sources (a, b, c &d), M is the number of delay types (α, β, γ & δ) and L is the number of detectors (1,2,3 &4). This system is functionally equivalent to the system depicted in FIG. 17. Amplifiers are not depicted.

One of the major problems associated with transmitting light pulses through a vector of fiber tips is the gaps between the illuminated spots. This is the result of the finite size of the fiber's clad while the actual transmission is performed through the smaller fiber core. This limitation is presently reduced by using fibers with reduced clad diameter. A more cost effective solution is presented in this invention. This solution is based on using dispersive component in addition to transmission in more then one wavelength as shown in FIG. 14 through FIG. 18.

Figure 19:
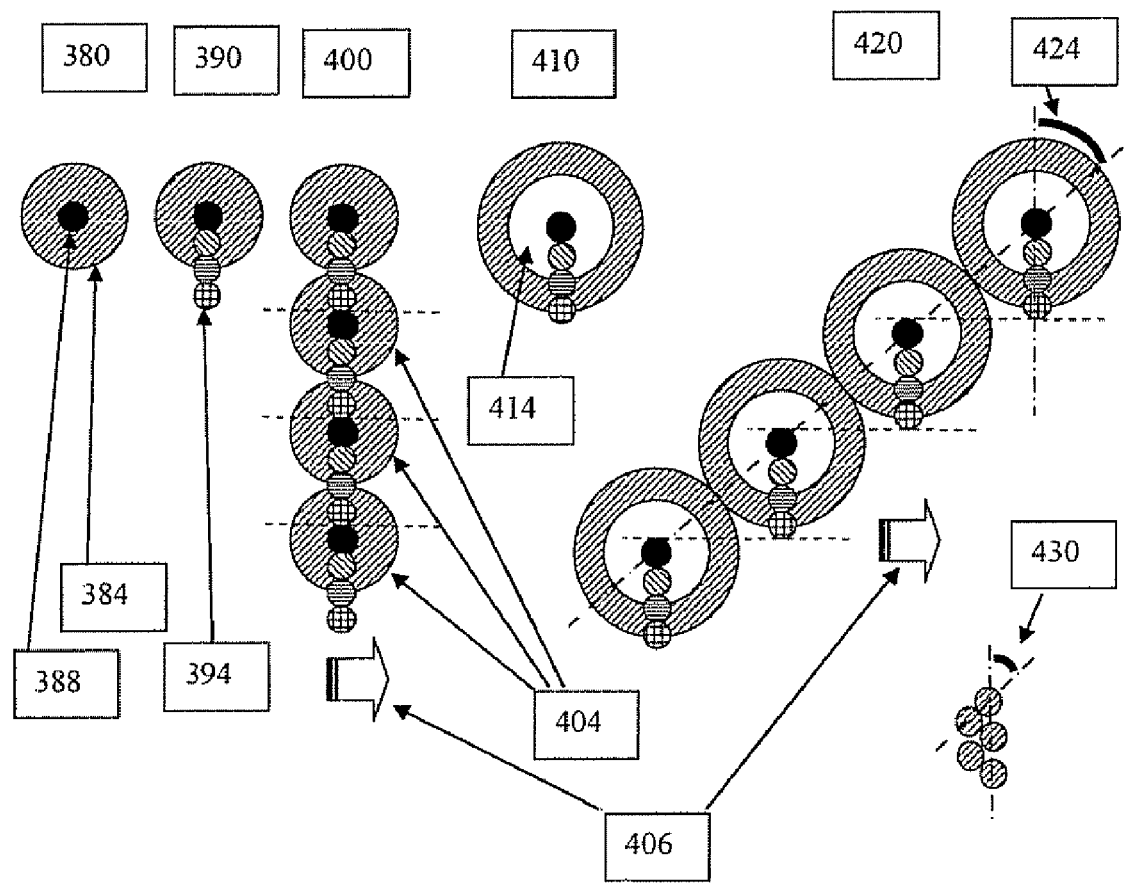
FIG. 19 is a schematic projection of the distribution of the far field illumination spots on the fiber vector and depicts a technique for achieving optimal field factor of the scanned FOV.

In order to describe this method, reference is now made to FIG. 19. The distribution of the power of the illumination light in the focal plane of the optical setup is imaged to the far field as illuminated spots. In this figure the far field distribution and the focal plane fiber vector are depicted on top of each other. A single fiber tip 380 has a clad 384 and a core 388. If the light emerging from this fiber pass through a dispersing component it will spread according to its spectrum. In 390 this spread is depicted as a set of points 394 each having a different wavelength. If the spectrum is continuous than the spread will also be one. In a fiber vector 400, according to this invention, the dispersing component is oriented to disperse along the orientation of the vector of fibers 404. The amount of dispersion needed and how to align the dispersion orientation is a well known practice to person is skilled in the art of optics. Consequently, a complete vector of illumination is generated having no gaps. The direction of scanning this vector is preferably according to 406. In the case of a fiber having larger clad 410 (for example in the case of a fiber with inner clad 414) or in the case where the dispersion is low relative to the caps between the fiber cores, the orientation of the dispersion should be set to be perpendicular to the scanning direction 406 while the vector of fibers should be tilted at an angle 424, or in an another packed shape based on this angle (430).

In general this invention enable achieving optimal fillfactor of a scanning vector by using a dispersive component and transmitting a broad spectrum of wavelengths.

Figure 20:
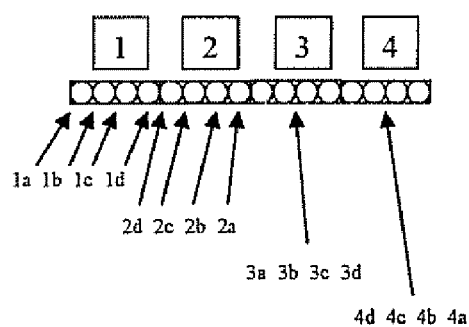
FIG. 20 is a schematic representation of a modified vector of fiber tips designed to reduce the significance of crosstalk between adjacent IFOVs associated with different detectors.

Crosstalk between adjacent IFOVs (fiber tips) can introduce distortion. For example in FIG. 7. This crosstalk can be substantially reduced by maintaining proper margins in the time domain. However, fiber tips located at the edge of each fiber group could generate distortion due to crosstalk with adjacent fiber in another group detected by a different detector. This problem can be fixed by changing the order of the fiber tips as shown in FIG. 20. In this figure the 16 fiber tips are shown. Each fiber tip is numerated according to it's light source origin (a, b, c or d) and its group or detector (1,2,3 or 4). In this order of fiber tips, adjacent fibers are either time multiplexed when being detected by the same detector (for example 3b and 3c) or transmitting at the same time by the same source (1d next to 2d, 2a next to 3a and 3d next to 4d). In other words, the illumination subsystem and the detection subsystem are configured such that every pair of adjacent LADAR image pixels satisfies one of the following conditions: the pair of adjacent pixels are illuminated at the same time; or the pair of adjacent pixels are detected by a common one of the one or more detectors. This way crosstalk does not generate ambiguity and is less significant.

Other variations of this invention are possible. In all these combinations the LADAR is defined by transmission light pulses to various directions within the FOV. Where, the system can differentiate between the signals received from the various directions using a combination of detectors having a predetermined FOV and associating a specific received signal to a specific transmitted pulse according to the time it was received.

In general: various combinations of lasers can be used to integrate this LADAR system. Different numbers of lasers can be used, different number of detectors, the orientation of the fibers can be other than line. However all the configurations typically have the following properties:

The multiplication product of the number of lasers (i.e., the number of time multiplexed or wavelength multiplexed outputs) by the number of detectors equals the number of IFOVs.

The resolution within the FOV associated with every detector is determined by the number of different lasers (i.e., the number of time multiplexed or wavelength multiplexed outputs) illuminating this FOV.

Quadrature Detection

The system can be downscaled to two main quadrate detection configurations: a single detector with four lasers/fibers; or two detectors with two lasers/fibers.

Figure 21:
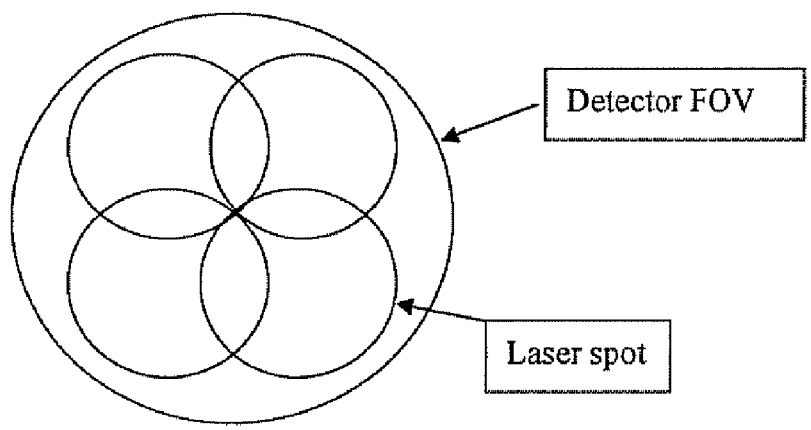
FIG. 21 is a schematic representation of a quadrature detection method based on illumination of the FOV associated with a single detector by four different lasers.

FIG. 21 describes schematically the FOV of a single detector and the illumination spots of four different lasers. By using the same TDM method previously described it is possible to distinguish between the reflections from the various spots and thereby achieve what is commonly referred as 'quadrate detection'. One of the advantages of this method is that it is possible to switch to simultaneous transmission of the lasers, achieving 'single pulse single detector' configuration. This configuration has an improved SNR at the expanse of spatial resolution. All this is performed without moving parts.

Figure 22:
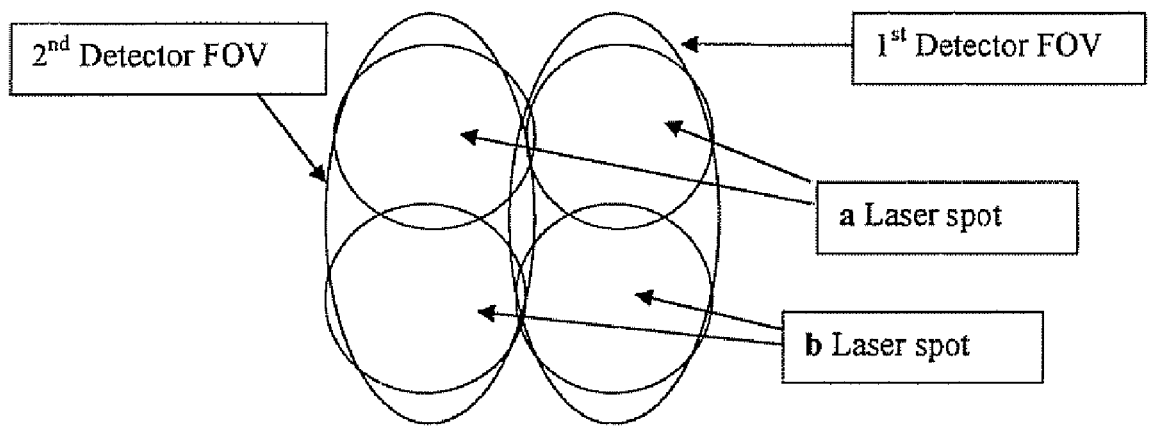
FIG. 22 is a schematic representation of a quadrate detection method based on two detectors and two lasers, each having two illumination spots.

In FIG. 22 the same FOV is described as in the previous figure, only here there are two detectors and only two fibers. The same method previously described is used in order to distinguish between the reflections from the four IFOVs.

Figure 23:
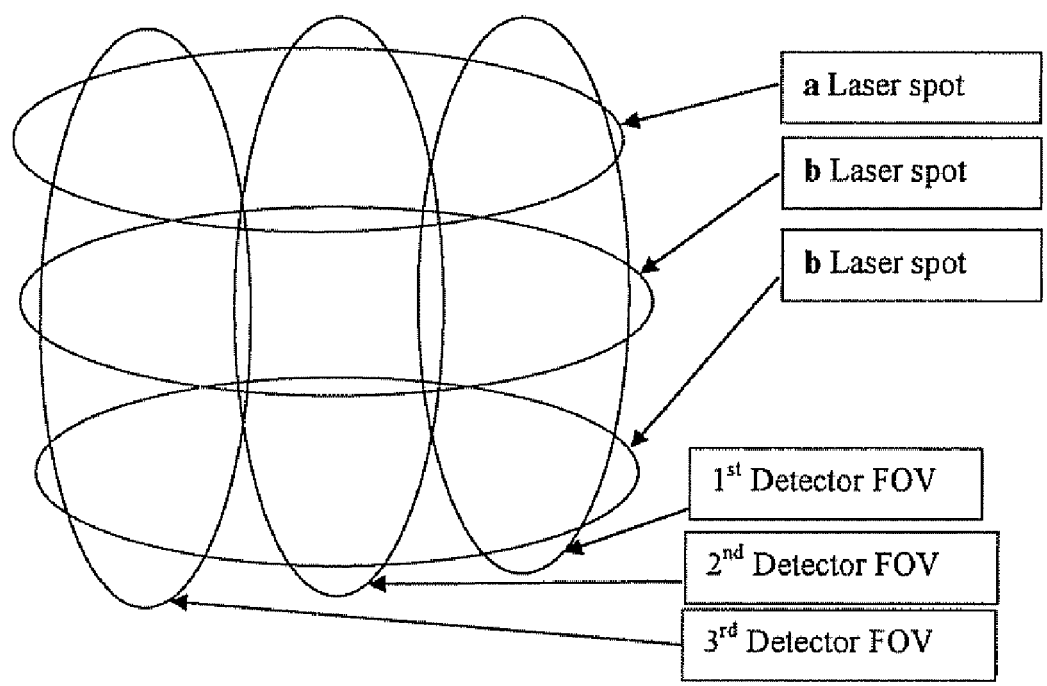
FIG. 23 is a schematic representation of a 3 by 3 FOV is investigated by oval shaped illumination spots of 3 lasers and 3 detectors.

More elements can be used for illuminating and detecting the field of view based on a matrix form as described in FIG. 23. In the matrix form every laser illuminate a line in the FOV and every detector receives light from a different line. In the example for this embodiment presented in FIG. 23, 9 IFOVS can be investigated by 3 lasers illuminating oval spots and 3 detectors. The identification of every IFOV is performed by TDM method previously described.

As mentioned earlier, it will be noted that the wavelength division multiplexing described above may be implemented instead using polarization division multiplexing (PDM) where the WDM components are replaced by polarization beam splitters and the delay fibers are polarization maintaining fibers. In this case, only two delays are introduced.

What is claimed is:

1. A LADAR system comprising:
(a) a detector optical arrangement defining a current optical field of view;
(b) an illumination subsystem configured for transmitting pulsed illumination at different times to each of a plurality of illumination sub-regions of said current optical field of view without moving parts such that each of said illumination sub-regions is illuminated at a different time from others of said illumination sub-regions; and
(c) a detection subsystem including one or more detectors deployed for detecting reflected illumination from a corresponding one or more detection sub-region of said current optical field of view,
wherein each of said one or more detection sub-regions overlaps a plurality of said illumination sub-regions, an overlap of each of said illumination sub-regions with said detection sub-region defining a LADAR image pixel of resolution finer than said detection sub-region,
and wherein the pulsed illumination transmitted to each of said illumination sub-regions is transmitted from the tip of at least one optical fiber, each of said optical fibers defining at least part of a waveguide which includes an optical amplifier deployed for amplifying pulses of said pulsed illumination prior to transmission.

2. The LADAR system of claim 1, wherein sequential pulses transmitted to differing ones of said illumination sub-regions are transmitted at times differing by no more than 10 microseconds.

3. The LADAR system of claim 1, wherein illumination pulses transmitted to at least two of said illumination sub-regions originate from a single laser source, and wherein a time delay between said illumination pulses is introduced by an optical path difference between paths traveled by pulses to said at least two illumination sub-regions.

4. The LADAR system of claim 1, wherein illumination pulses transmitted to at least two of said illumination sub-regions originate from at least two illumination sources electronically triggered to generate pulses at different times.

5. The LADAR system of claim 1, wherein said illumination subsystem and said detection subsystem are configured such that every pair of adjacent LADAR image pixels satisfies one of the following conditions: the pair of adjacent pixels are illuminated at the same time; or the pair of adjacent pixels are detected by a common one of said one or more detectors.

6. The LADAR system of claim 1, wherein said detection subsystem includes a plurality of said detectors, an area of intersection between each of said illumination sub-regions and each of said detection sub-regions uniquely defining one of said LADAR image pixels, a number of said LADAR image pixels being equal to the product of the numbers of said illumination sub-regions and said detection sub-regions.

7. The LADAR system of claim 6, wherein each of said detection sub-regions is a substantially contiguous sub-region within said current optical field of view, and wherein each of said illumination sub-regions is a pattern of disparate spots distributed between said detection sub-regions.

8. The LADAR system of claim 6, wherein each of said illumination sub-regions is a substantially contiguous sub-region within said current optical field of view, and wherein each of said detection sub-regions is a pattern of disparate spots distributed between said illumination sub-regions.

9. The LADAR system of claim 6, wherein each of said illumination sub-regions is elongated in a first direction, and wherein each of said detection sub-regions is elongated in a second direction non-parallel to said first direction such that said LADAR image pixels form a two-dimensional grid.

10. The LADAR system of claim 1, wherein said illumination subsystem and said detection subsystem transmit and receive illumination via said detector optical arrangement.

11. The LADAR system of claim 1, wherein said tips of said optical fibers are arranged as a focal plane array of optical fiber tips.

12. The LADAR system of claim 1, wherein said illumination subsystem transmits from each of said optical fiber tips pulses of illumination differing in at least one property selected from the group comprising wavelength and polarization, said pulses being directed by an optically dispersive arrangement such that pulses from each of said optical fiber tips are transmitted in a plurality of directions.

13. The LADAR system of claim 1, wherein said current optical field of view has a long dimension and a short dimension, the LADAR system further comprising a scanning arrangement for scanning said current optical field of view in a direction substantially perpendicular to said long dimension.

14. The LADAR system of claim 1, further comprising a controller associated with said illumination subsystem and configured for actuating an illumination pulse for each of said plurality of illumination sub-regions in rapid sequence before receipt of any reflected illumination pulse.

15. The LADAR system of claim 1, further comprising a controller associated with said illumination subsystem and configured for actuating an illumination pulse for each of said plurality of illumination sub-regions in a timed sequence to allow for receipt of a reflected illumination pulse between successive transmitted pulses.

16. The LADAR system of claim 1, further comprising a controller associated with said illumination subsystem and configured for dynamically varying timed actuation of an illumination pulse for each of said plurality of illumination sub-regions between a long-range mode in which illumination pulses for all illumination sub-regions are transmitted in rapid sequence before receipt of any reflected illumination pulse and a short-range mode in which a delay is introduced between transmission of pulses to a first subgroup and a second subgroup of said illumination sub-regions to allow for receipt of a reflected illumination pulse between successive transmitted pulses.

17. The LADAR system of claim 1, wherein both said illumination subsystem and said detection subsystem are connected via fiber coupling arrangements to a set of optical fibers terminating at tips arranged at a focal plane of said detector optical arrangement such that each optical fiber tip transmits an illumination pulse to a given LADAR image pixel and receives reflected radiation from said given LADAR image pixel.

18. The LADAR system of claim 17, wherein said fiber coupling arrangement includes a fiber coupler comprising:
    (a) a primary optic fiber associated with said illumination subsystem, said primary optic fiber having a core and a clad, said clad having a first refractive index; and
    (b) a branch fiber associated with said detection subsystem, said branch fiber forming an acute-angled junction with said primary optic fiber, at least part of said branch fiber having a higher refractive index than said first refractive index, said at least part of said branch fiber optically coupled with said clad of said primary optic fiber but spaced from said core of said primary optic fiber.

19. The LADAR system of claim 17, wherein said fiber coupling arrangement includes an optical circulator.

20. The LADAR system of claim 1, wherein said pulsed illumination is supplied to said waveguide from at least one fiber laser.

21. The LADAR system of claim 20, wherein said pulsed illumination for illuminating a first of said illumination sub-regions is supplied to a corresponding one of said waveguides from a first fiber laser and said pulsed illumination for illuminating a second of said illumination sub-regions is supplied to a corresponding one of said waveguides from a second fiber laser, the LADAR system further comprising a controller associated with said illumination subsystem and configured for triggering said first and second fiber lasers to generate illumination pulses such that said second fiber laser generates pulses at times differing from illumination pulses generated by said first fiber laser.

22. The LADAR system of claim 1, wherein said at least one optical fiber is part of an optical fiber arrangement having a plurality of optical fibers including:
    (a) a first optical fiber portion for carrying a first optical signal of said pulsed illumination; and
    (b) a splitter for dividing said first optical signal such that second and third optical signals similar to said first optical signal propagate within corresponding second and third optical fiber portions, and wherein at least two of said optical amplifiers are deployed for amplifying said second and third optical signals in each of said second and third optical fiber portions.

23. The LADAR system of claim 22, wherein said third optical fiber portion includes an extension portion configured to introduce an optical path difference between paths traveled by said second and third optical signals, thereby introducing a delay between illumination pulses of said second and third optical signals.

24. A LADAR system comprising:
    (a) a detector optical arrangement defining a current optical field of view;
    (b) an illumination subsystem configured for transmitting pulsed illumination at different times to each of a plurality of illumination sub-regions of said current optical field of view without moving pads such that each of said illumination sub-regions is illuminated at a different time from others of said illumination sub-regions; and
    (c) a detection subsystem including a plurality of detectors deployed for detecting reflected illumination from a corresponding plurality of detection sub-regions of said current optical field of view, wherein each of said plurality of detection sub-regions overlaps a plurality of said illumination sub-regions such that an area of intersection between each of said illumination sub-regions and each of said detection sub-regions uniquely defines one of said LADAR image pixels, a number of said LADAR image pixels being equal to the product of the numbers of said illumination sub-regions and said detection sub-regions.

* * * * *